Patented Dec. 17, 1946

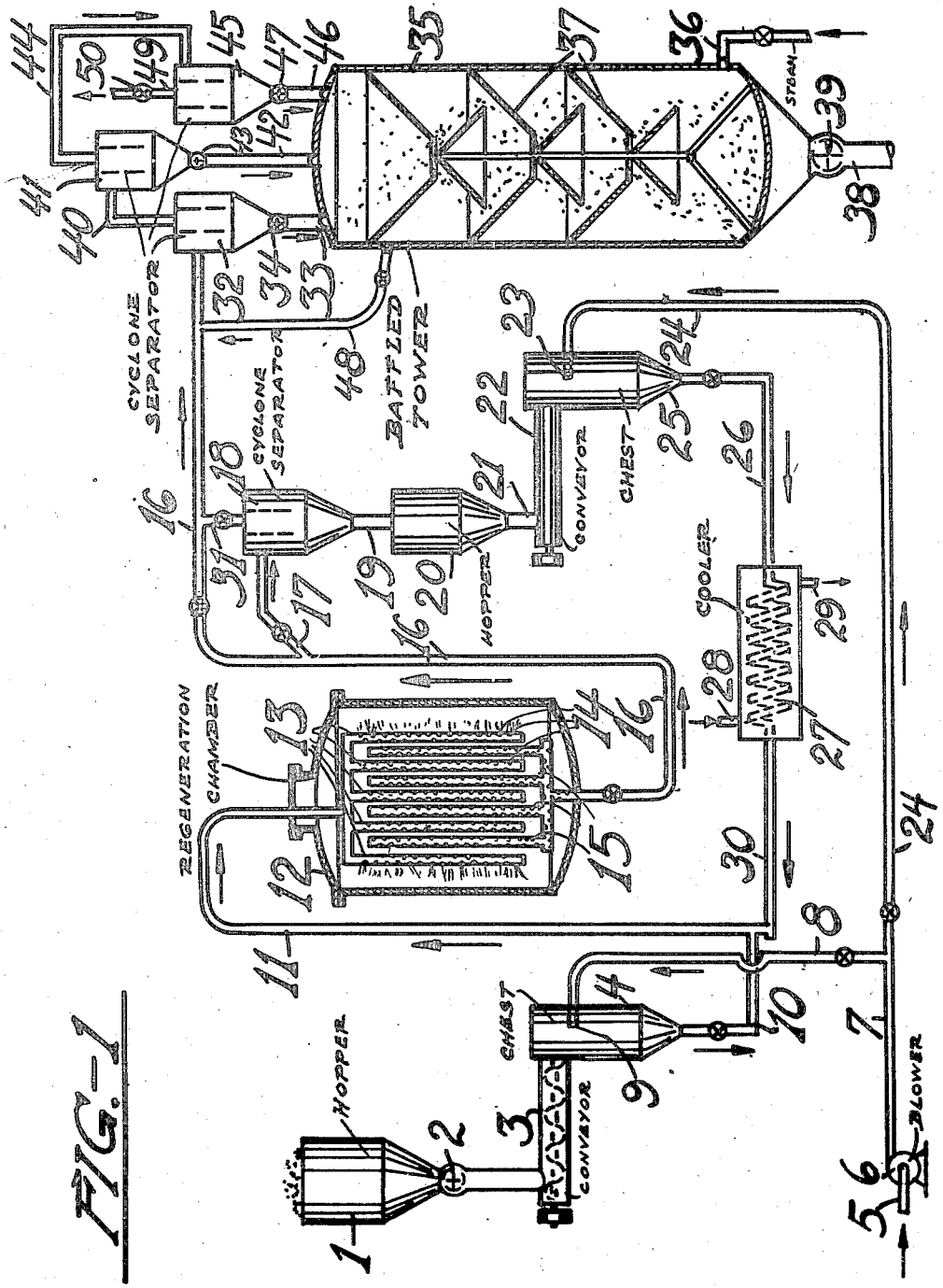
Dec. 17, 1946.  J. R. SCHONBERG ET AL  2,412,696
PROCESS FOR REGENERATION OF CRACKING CATALYSTS
Filed Oct. 23, 1940  2 Sheets-Sheet 1
Jackson R. Schonberg
Donald L. Campbell Inventors
By C. A. Young Attorney

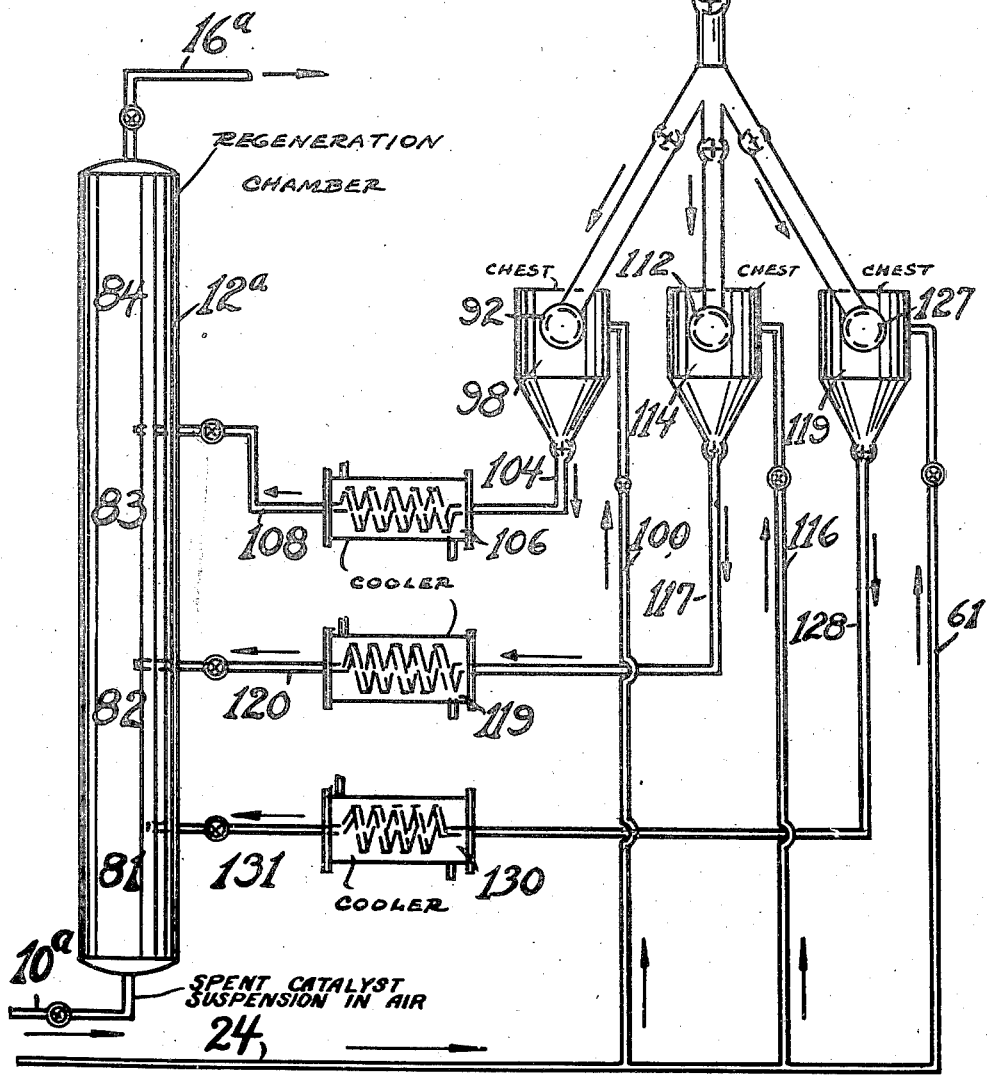

2,412,696

UNITED STATES PATENT OFFICE 2,412,696

PROCESS FOR REGENERATION OF CRACKING CATALYSTS

Jackson R. Schonberg, Westfield, and Donald L. Campbell, Roselle Park, N. J., assignors to Standard Oil Development Company, a corporation of Delaware Application October 23, 1940, Serial No. 362,380

2 Claims. (Cl. 252—242)

The present invention relates to improvements in the art of reactivating or regenerating solid divided catalytic materials containing carbonaceous contaminants by means of combustion of the catalyst contaminants under closely controlled conditions. The catalyst may be an acid-treated clay, silica gel, or a plural gel, such as silica-alumina gel or alumina-silica compositions in powder form and its regeneration may be of the type wherein the catalyst is suspended in an oxygen containing gas during regeneration. The catalyst contamination may be due to its suspension in high boiling hydrocarbons under cracking conditions.

It is, of course, well known that when an acid-treated clay is contacted with a hydrocarbon oil under suitable conditions of temperature, pressure, time and intimacy of contact, as for example, where a gas oil is cracked in the presence of an acid-treated clay, the process results in the progressive deposition of carbonaceous materials upon the catalyst. These contaminants impair the activity of the catalyst and necessitate the removal from the conversion operation, of the catalyst after it has accumulated about ⅓% to 5% by weight of contaminants for revivification or regeneration and as indicated, the most satisfactory regeneration method is one in which the contaminants are removed by combustion of the latter.

Our present invention is concerned with the regeneration of a solid spent catalyst by burning or oxidizing the contaminants under closely controlled conditions of time of contact of catalyst and regeneration gas; also of temperature, pressure, and intimacy of mixing and handling of the catalyst, so as to prevent overheating or baking of the catalyst, or otherwise injuring its activity. It is generally known in the art that a catalyst such as an adsorbent clay catalyst cannot be subjected for a considerable length of time to a temperature above 1100° F., certainly not above 1200° F., without permanently injuring the catalyst. It is also known that catalysts of the type indicated can be regenerated without injury by using air strongly diluted with inert or non-oxidizing gases. This can be done by suspending the fouled catalyst in a mixture of the air and other gases at a temperature just above that at which combustion proceeds with reasonable rapidity, and the presence of the diluting gases insures that the heat generated by the combustion will not raise the catalyst temperature and the resulting mixture of gases above a temperature at which injury to the catalyst ensues. However, one disadvantage of this process is that it requires a large combustion chamber to provide the necessary time of contact due to the large volume of total gases required. This known process also requires large and expensive equipment to separate the regenerated catalyst from the gases leaving the combustion chamber.

The main object of our invention is to regenerate a fouled catalyst, suspended in a regeneration gas, to remove the suspension after regeneration of the catalyst from the regeneration zone, and to return a portion of the regenerated catalyst from said removed suspension, after cooling, to one or more points in said regeneration zone in order to control the temperature of the regeneration.

Other and further objects of our invention will appear from the following more detailed description.

These objects may be carried out by the process and apparatus hereinafter fully described in conjunction with the accompanying drawings forming part of this specification.

In the accompanying drawings, Fig. 1 shows a combination of apparatus elements diagrammatically and in partial vertical section, in which catalyst may be suspended in a regeneration gas, conducted to a regeneration chamber, removed from said regeneration chamber, separated from the gaseous constituents and returned in part after cooling to the regeneration zone to aid in controlling the temperatures therein prevailing, and in Fig. 2, which is a modification of the process illustrated by Fig. 1, means are provided for returning the cooled regenerated catalyst to the regeneration zone at a plurality of spaced apart points.

Our invention will now be more specifically described in its embodiment shown in accompanying Fig. 1. Referring in detail to the drawings, the reference character I designates a hopper containing a powdered catalyst to be regenerated. This material may comprise, for example, naturally active or activated adsorbent clays or synthetic adsorbent materials of the same or different composition. The catalyst, we may assume, is contaminated with carbonaceous deposits as a result of contact with hydrocarbon vapors during an oil cracking operation.

Prior to regeneration of the catalyst material, it may be purged to remove volatile hydrocarbons. There are many known methods of purging or stripping the catalyst. Most of them involve causing the catalyst to flow countercurrent against a gas, such as steam heated to approximately the temperature of the catalyst itself. The catalyst material still at an elevated temperature, approximately that of the outlet of the cracking reactor is continuously withdrawn from the hopper 1 by means of a feeding mechanism, such as a star feeder 2, and discharged into a suitable transfer mechanism, such as a screw conveyor 3, and by means of the latter discharged into a chamber or chest 4.

Air or other free-oxygen-containing regeneration gas at atmospheric temperature is drawn through line 5 into blower 6, discharged to lines 7 and 8, through a suitable regulating valve in line 8, and into said chest at point 9. Within said chest a suspension of the catalyst in the regeneration gas is formed. From chest 4 the suspension is withdrawn through line 10, thence discharged into line 11 containing a suspension of cooled, recently regenerated catalyst suspended in air or other free-oxygen-containing gas in a manner which will be presently fully described, and the confluent suspensions are discharged into a regeneration chamber 12 through means provided to agitate the contents of said chamber. This latter means may consist of an inlet manifold discharging through a number of pipes 13 extending vertically downward into the chamber, each pipe discharging through a number of perforations or nozzles 14, directing flow horizontally into the chamber. Similarly the suspension may be withdrawn from the chamber through a like arrangement of nozzles and manifold pipes 15 adapted to receive and conduct the suspension downwardly and out of the chamber 12 through line 16.

The use of the above mentioned pipes and nozzles causes the contents of the regeneration chamber to be thoroughly agitated, and intermixed. The injected suspension of catalyst is heated by contact with the contents of the chamber to the temperature of combustion of the catalyst contaminants which is proceeding in the chamber. Therefore, the catalyst throughout its time of residence in the chamber is at a considerably higher average temperature than it would be if it passed, let us say, lengthwise through a long narrow chamber in which there was no agitation of the contents and little, if any, heat transfer from the catalyst already resident for some time in the chamber to that portion of catalyst at its moment of entry. The above-mentioned agitation permits cooling either the suspension of spent catalyst or the suspension of recycled recently regenerated catalyst or both to a relatively low temperature while still obtaining relatively rapid combustion in the regeneration chamber. This cooling of the suspensions to low temperatures is of advantage in reducing the rate of catalyst recycling required in order to provide sufficient cooling in the regeneration chamber. Also with all of the catalyst in the regeneration chamber being oxidized at a relatively high temperature rather than at a temperature rising gradually from a relatively low inlet temperature to a higher outlet temperature, the rate of oxidation is increased and the size of the regeneration chamber required is correspondingly reduced.

A portion of the suspension is withdrawn from line 16 through line 17 and a suitable regulating valve and discharged into cyclone separator 18. The major portion of the catalyst contained in the said portion of the suspension is separated from the regeneration gas in said separator and is removed through line 19 into hopper 20, thence it is withdrawn through line 21 to conveyor 22, which may be similar to conveyor 3, above described. The conveyor 22 discharges the said catalyst into chest 25 where it is suspended in compressed air supplied by blowers 6 through lines 7 and 24 and a suitable control valve in the latter line, the air being discharged into the chest at point 23. The suspension is withdrawn through line 26 and forced through heat exchanger 27 where it is cooled by a cooling medium introduced through line 28 and withdrawn through line 29. The cooled, suspended catalyst is withdrawn from the heat exchanger 27 through line 30 and mixed with the suspension of fouled catalyst, leaving line 10, in line 11 as previously stated.

The portion of the suspension in line 16 from which it is not desired to remove catalyst for return to the chamber is withdrawn through a regulating valve and admixed with the gas recovered from separator 18 and both are discharged into an initial cyclone separator 32 where the bulk of the catalyst is separated from the gas. The catalyst so separated drops to the bottom of said cyclone separator and is discharged into conduit 33 through star feeder 34 into a stripping chamber 35, wherein it passes downwardly in countercurrent flow against an upflowing stripping gas, such as steam $CO_2$, flue gas, etc., introduced into the stripping chamber through line 36. The stripping chamber 35 is preferably provided with a plurality of baffles such as inverted cone and slanted peripheral baffles 37 to insure intimate contact between the catalyst and the stripping gas. The stripping or purging gas serves to remove oxygen containing gases from the catalyst. The stripping gas introduced into the stripping chamber 35 passes upwardly therethrough and is discharged therefrom through line 48 into line 16 as shown, where it admixes with the suspension therein and is thereafter processed with the latter.

The powder, after being purged of regenerating gases in the stripping chamber 35, is collected in the bottom thereof and may be removed therefrom to conduit 38 carrying a suitable pressure seal such as a star feeder 39. The regenerated catalyst is preferably passed directly to a conversion unit, e. g., a cracking unit (not shown) while still at elevated temperature so that the heat of regeneration can be utilized in carrying out the conversion treatment.

Gas from the cyclone separator 32, having the bulk of the powdered catalyst removed therefrom, but still containing a substantial amount of powdered material, is removed from the cyclone separator 32 through line 40 leading to a second cyclone separator 41 wherein further powder is removed from the regenerating gases. Regenerated powder separated in the second cyclone separator 41 drops to the bottom thereof and may be removed to line 42 and introduced into the top of the stripping chamber 35 wherein it is stripped of regenerating gases in the same manner as the catalyst from the initial cyclone separator 32. The conduit 42 is preferably provided with a suitable pressure seal such as a star feeder 43 to prevent the stripping gases from passing upwardly into the second cyclone separator. The gases, after passing through the second cyclone separator 41, are removed therefrom through line 44 leading to a third cyclone separator 45 for removal of the remainder of the catalyst from the regenerating gases. Catalyst separated in the third cyclone separator 45 is discharged into the stripping chamber 35 through line 46, provided with a star feeder 47. The regenerating gases, after passing through the third cyclone separator 45, are substantially free of powdered catalyst. The gases are removed from the third cyclone separator 45 through line 49, and may be rejected from the system through a pressure relief valve 50 adapted to impose the desired back pressure on the system.

It will be understood that the apparatus described may be modified in many ways known to those skilled in the art. For example, the means used for conveying the catalyst from hopper 1 into the chest 4 may comprise a lock hopper system such as was shown in the prior application of Donald L. Campbell, Serial No. 311,477, filed December 29, 1939, with suitable alterations to permit operating the uppermost compartment under low pressure and the lowermost compartment under high pressure, or may consist of some other device for conveying the fouled catalyst continuously against the pressure differential. Similarly, conveyors 3 and 22 may be replaced by some other device for accomplishing the same purpose.

Also, the means for injecting the regenerating suspension through line 11 into regeneration chamber 12 may be varied. For example, the suspension may be injected through a Venturi mixer into which the contents of the regeneration chamber are drawn for the purpose of agitation with the incoming suspension, or, as another alternative, the contents of the chamber may be agitated by means of a multi-bladed fan as disclosed in the prior application of Donald L. Campbell, Serial No. 234,555, now U. S. Patent 2,282,453, filed November 12, 1938.

Further, the means for removing from the suspension leaving the regeneration chamber, the portion of the catalyst which it is desired to return to the regeneration chamber may be varied. For example, all of the suspension leaving the chamber may be withdrawn through a single cyclone separator from which part of the separated catalyst is returned to the regeneration chamber and part withdrawn through suitable apparatus for further use in cracking. Also, other means may be employed, such as electrical precipitators, to remove the catalyst from the suspension.

The heat exchanger 27 may be a boiler waterfeed preheater or a waste-heat boiler, or a preheater for the feed to the catalytic unit.

It will, of course, be understood that the operating conditions prevailing in chamber 12 should be varied to suit a number of conditions, such as the kind and character of the catalyst, the temperature which it can stand without injury, the amount and character of the contaminants on the catalyst, and the degree to which these are to be removed to make the catalyst suitable for further use, and other factors. However, generally speaking we may say that the following conditions in the chamber give good results:

Pressure from 1 to 30 atmospheres absolute.
Temperature of mixed suspensions entering regeneration or combustion vessel from atmospheric to 950° F.
Temperature of suspension leaving combustion vessel from 1000 to 1100° F.
Ratio of recycled catalyst to contaminated catalyst by weight from 0.5:1 to 6:1.
Air or equivalent oxygen-containing gas used 2.5 to 3.5 cubic feet per minute measured at standard conditions per pound of carbonaceous deposits to be burned from the catalyst per hour.

The modification shown in Fig. 2 has regard to the form and construction of the regeneration vessel and the means for supplying regenerated catalyst and spent catalyst to the said regeneration chamber. That is to say, the catalyst is suspended in this modification in exactly the same manner as in the modification shown in Fig. 1, thence the suspended catalyst is discharged into line 10a and thereafter passed into the bottom of an elongated regeneration chamber 12a.

In the illustration shown we may consider that the regeneration chamber 12a contains four zones viz. zones 81, 82, 83 and 84. Hot regenerated catalyst is withdrawn from a hopper 90, discharged into a screw conveyor 92, (shown only in end view) thence into a chest 98, where it is dispersed in air discharged into the chest through valve line 100. The dispersion of hot regenerated catalyst in air is then withdrawn from the chest 98 through conduit 104, thence passed through a cooler 106, where a portion of the sensible heat of the catalyst is removed by heat transfer to a cooling medium such as water, with which it comes in indirect heat transfer relationship. The cooled catalyst is then withdrawn from the cooler through conduit 108 and discharged into the uppermost portion of the zone represented by the reference character 83. In like manner, catalyst from hopper 90 is discharged into screw conveyor 112, thence into chest 114 where it is dispersed in air discharged into the chest through line 116. Thereafter the catalyst is withdrawn through line 117, discharged into a cooler 119, similar to cooler 106, and thence discharged through line 120 into the uppermost portion of zone 82. Finally, the catalyst in hopper 90 is discharged into screw conveyor 127, thence discharged into mixing chest 119 where it is dispersed in air discharged into the chest through line 61, thence withdrawn through conduit 128, thence discharged into cooler 130, and then forced into zone 81. The spent catalyst passing upwardly through the regeneration vessel is periodically contacted with cooled regenerated catalyst in the manner shown. The catalyst enters the zones 81, 82, 83, and 84 at the minimum temperature at which reasonably rapid combustion can be obtained, say a temperature of 850° F. or thereabouts, and leaves the several zones at the maximum permissible temperature that will not cause impairment or destruction of the catalyst. The hot catalyst undergoing regeneration is cooled by the cooled regeneration catalyst from the maximum temperature to the minimum temperature at which reasonable rapid combustion may take place. Also, the amount of oxygen in line 10a is so regulated as to be substantially all consumed at the point where further quantities of oxygen is added together with cooled catalyst through line 131. Similarly, the oxygen added through this line 131 is consumed, or substantially consumed, when a further quantity of oxygen is added through line 120, and the oxygen added through line 120 is consumed through combustion by the time the gases have attained the level where the suspension of catalyst in oxygen or air is added through line 108. The suspension of catalyst is eventually withdrawn through line 16—a from the top of the regeneration chamber, and it may be recovered from the flue gases by passing it through one or more cyclone separators not shown in this Fig. 2 but fully illustrated in Fig. 1.

The pressure in the regeneration chamber may vary between 1 and 30 atmospheres absolute. The amount of cooled regenerated catalyst added to the regeneration vessel or chamber, as compared with the amount of spent catalyst added therefor, may vary within the limits of from 0.75 to 6 parts by weight of regenerated catalyst to 1 part of spent catalyst. The amount of oxygen added to conduits 10—a, 108, 120 and 131 will obviously depend on the amount required to consume by oxidation the contaminants deposited on the catalyst and the amount of spent catalyst passing through the regeneration vessel 12—a in a given time. Ordinarily the catalyst will contain from 1% to 3% carbonaceous deposit by weight, and it can be assumed that this is largely carbon, although, of course, there is some hydrogen present in the form of hydrocarbons of high unsaturation. The amount of air supplied to the regeneration vessel 12—a should be 2.5 to 3.5 cubic feet per minute measured at standard conditions per pound of carbonaceous deposits to be burned from the catalyst per hour.

The temperature of the inlet air may vary from atmospheric to 800° F. The temperature of the recycled catalyst may vary from 400° to 1100° F. The temperature of the contaminated catalyst may vary from 650° to 1000° F. (depending on the temperature in the catalytic conversion process which caused the contamination). The minimum temperature at any point in the regeneration chamber may be from 750° to 950° F. The temperature of the suspension leaving the chamber may be preferably from 1000° to 1100° F., but certainly within the range from 900° to 1200° F.

It is to be understood that the methods described above for regenerating the catalyst and making it suitable for further use are also applicable to the revivification of spent clays from other processes in which certain clays are rendered less active by deposits of combustible materials.

Having described the specific embodiments, it will be understood that the invention embraces such other variations and modifications as come within the spirit and scope thereof.

What we claim is:

1. In the method of regenerating a spent powdered catalyst in which said powdered catalyst is suspended in a free-oxygen-containing gas and passed through a regeneration zone, the improvements which comprise suspending a hot, recently regenerated catalyst in a free-oxygen-containing gas, cooling the last-named catalyst suspension, intermixing the suspension of regenerated and a suspension of spent catalyst, discharging the mixture into the regeneration zone, maintaining said mixture in said regeneration zone in a highly agitated state by causing the mixture to flow in the reaction zone in a multiplicity of vari-directional currents and for a sufficient period of time to effect the desired regeneration, recovering the total catalyst discharged from the regeneration zone and resuspending a portion of the hot regenerated catalyst in additional free oxygen-containing gas as aforesaid.

2. In the method of regenerating spent powdered catalyst in which said powdered catalyst is suspended in a free-oxygen-containing gas and passed through a regeneration zone, the improvements which comprise suspending a hot, recently regenerated catalyst in a free-oxygen-containing gas, cooling the last-named suspension, suspending a spent catalyst in a free-oxygen-containing gas, intermixing the suspensions of spent and regenerated catalysts, discharging the mixture into a regeneration zone through a number of perforated pipes extending vertically over a substantial portion of the regeneration zone and directing flow horizontally into the regeneration zone so as to thoroughly agitate and intermix the mixture within said regeneration zone, permitting the catalyst suspension to remain resident in the regeneration zone in a highly agitated state under regeneration conditions for a sufficient period of time to effect the desired regeneration, withdrawing the regenerated catalyst in suspension from the regeneration zone and resuspending a portion of the hot regenerated catalyst in additional free oxygen-containing gas as aforesaid.

JACKSON R. SCHONBERG.
DONALD L. CAMPBELL.